Patented Apr. 27, 1943

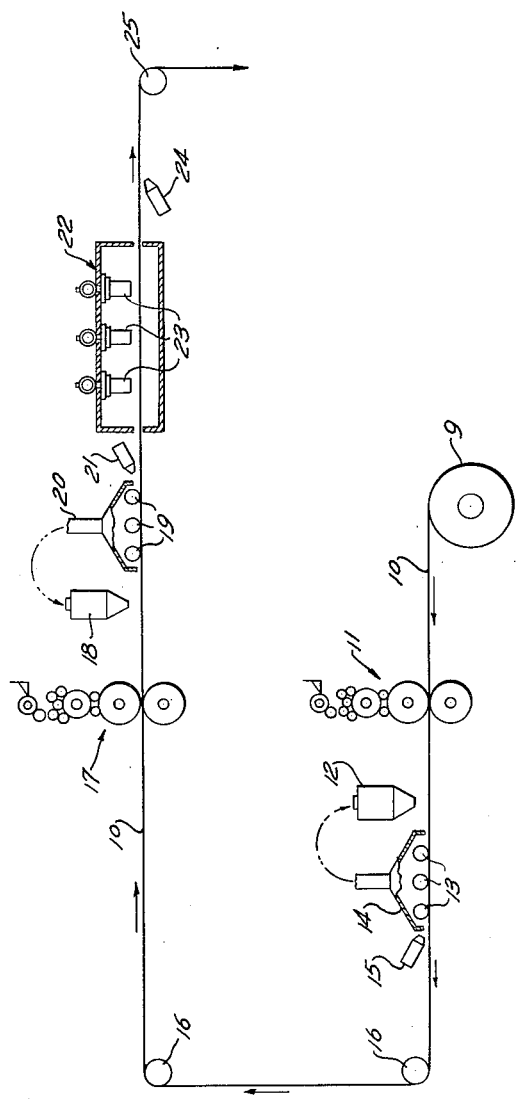

2,317,372

UNITED STATES PATENT OFFICE 2,317,372

METHOD OF PRINTING AND COMPOSITION USEFUL THEREIN

Albert E. Gessler, New York, and Dominic J. Bernardi, Astoria, Long Island, N. Y., assignors to Interchemical Corporation, New York, N. Y., a corporation of Ohio Application December 26, 1940, Serial No. 371,660

10 Claims. (Cl. 101—426)

This invention relates to a method of printing, and to compositions useful therein. In particular, this invention relates to a method of improving the gloss and drying of certain types of inks adapted to be set by the application of heat, and to compositions specially adapted for use in the method.

High speed printing of publications has, until recently, been limited to porous papers such as news stock, where sufficiently rapid drying is obtained by the absorption of the ink into the paper, the inks used being basically non-volatile petroleum oils. High speed printing on better quality paper was first obtained with the introduction of inks of the type described in the Gessler U. S. Patent No. 2,087,190; these inks comprise pigment dispersed in vehicles consisting of binder dissolved in solvent which is substantially non-volatile at ordinary temperatures, but which evaporates rapidly at higher temperatures of the order of 100°–150° C. For reasons of economy, the solvents are preferably petroleum distillates. The printed paper is dried by passing it through a zone of high heat at such a speed that the solvent is removed without charring the paper; web speeds of the order of 500 to 1000 feet per minute are obtainable.

While high speed printing is thus available with both cheap paper and better quality paper, certain disadvantages still exist. With newsprint, the ink is not dried but absorbed into the paper; it tends to smudge and blur, and gives a print of dull appearance, poor color value and low finish. The heat set inks do not smudge, and the finish is somewhat higher; but the high heats to which the inks are subjected seem to reduce the gloss of the films so that the finish obtained is not comparable with that obtainable with conventional slower drying inks.

We have discovered that the finish of both news ink and heat-set inks (which are alike in containing petroleum solvent so non-volatile at 25° C. that the inks are stable on the distributing system of a typographic press) may be substantially improved by dusting on the wet film of the ink a powdered high melting resin composition which is soluble in the hot solvent of the ink to give a viscous solution, removing all but a thin film of the powder adhering to the ink and then passing the prints through the conventional heating zone, where part of the solvent is evaporated, and the resin with absorbed solvent is melted to form an extremely thin hard film over the ink, thus drying the ink, imparting a finish thereto, and giving greater depth to the color.

While a somewhat similar process is conventionally used to produce raised printing which imitates engraving with conventional slow drying inks, our process differs so materially from it that the powders used in this prior art process cannot be used in our process. It is necessary to choose resins with certain well-defined characteristics, to obtain films which will improve the color and the finish while drying properly; and attention must be given to the fineness of the resin powder if a raised effect is to be avoided. We believe that the degree of solubility of the resin in the hot solvent of the ink is a vital factor in the failure of conventional prior art dusting resins in our process.

In general, the powdered materials used in our process may be resins alone, or mixtures of resin and wax. The resin used must in all cases be soluble in petroleum hydrocarbons at the drying temperature of 100°–150° C., and it must yield highly viscous solutions with such solvents. We have found that insoluble resins do not produce gloss, while resins which are too readily soluble (i. e., yield solutions of low viscosity) slow up the drying to such an extent that the prints will stick or offset on rewinding or stacking in piles. We have found that a satisfactory measure of maximum solubility is the viscosity of a standard solution of the resin in a standard solvent. A convenient standard solution is made by heating to 150° C. fifty parts by weight of resin and fifty parts by weight of a petroleum distillate having a boiling range of 255°–285° C., a specific gravity of about 0.90, a kauri-butanol number of about 47, a dimethyl sulfate value of 8 to 9, and a refractive index of about 1.517 at 30° C. A resin, to be satisfactory for our purpose, should produce a solution having a viscosity of at least 10 poises at 30° C. (as compared, for example, with about 3 poises for commercial glycerin at 30° C.).

The melting point of the resin or resin-wax composition is also important if satisfactory drying throughout the film is to be obtained. If resin alone is used, it should have a softening point, as determined by the standard A. S. T. M. ball and ring method not less than 100° C. When wax is added in the desired proportions of 5 to 25%, the finished prints are lubricated to some extent, so that the softening point of the resin-wax mixture may be lowered to a minimum of 90° C.

Another important feature of our dusting compositions is particle size. We have found that in order to get a desirable appearance with a minimum of resin, and to avoid any embossed effect, substantially all of the dusting composition should be ground so that 95% passes through a 200 mesh screen. In our commercial practice, our dusting powder will have an average particle size of about 16 microns. With such powders, the finished prints are not much thicker than ordinary printing ink films, having a maximum total thickness of not over about 0.25 mil.

When properly carried out, our method produces prints which dry more rapidly than conventional prints with the same inks (whereas slower drying is obtained with an improper dusting powder), and which have richer color and better finish than the undusted prints.

Our process may further be utilized where paper is being printed on two sides with heat-setting inks, to permit of two-side printing with a single heating operation. This may be accomplished because the resin dust effectively prevents offset, and permits of second side printing without drying; after the second side is printed, the two sides of the sheet may be simultaneously dried.

A typical set-up for carrying out our invention is shown in the attached schematic drawing. A web of paper 10 drawn from a feed roll 9 is printed on one side in a conventional typographic printing machine 11. The web passes under a hopper 12 from whence the dusting powder is deposited on the web. Excess powder is picked up by plush rolls 13 revolving under an exhaust hood 14, which conveys the powder back to a feeding system for the hopper 12. The final excess of powder is removed with an air blast 15, and is exhausted up the hood. The printed web is now offset-resistant, but not dry enough to handle. It is passed over rolls 16, and through a press 17 which prints the second side of the web. Dusting powder is then applied by a mechanism similar to that used for the first side, including a hopper 18, rollers 19, exhaust 20, and air blast 21. The web then passes through a heating chamber 22 provided with gas burners 23; such an oven is described in the Hess U. S. Patent No. 2,210,032, issued August 6, 1940. In the heating chamber, the resin is melted on both sides of the paper, and the solvent vaporized. As the web leaves the oven, it is preferably cooled on the bottom side by an air blast 24, and finally passes over a cooling roll 25 to a rewind, or to a cutter or the like.

The method can, of course, be used for single side printing, by eliminating the first side printing and dusting machinery.

Typical powdered compositions useful in the practice of the invention are the following:

*Example 1*

Pounds
Zinc-lime resinate (Zitro 135) (135–145° C. ball and ring melting range) _____ 90
Paraffin wax (85° C. melting point) _____ 10 are melted together, the composition is cooled, and powdered to 325 mesh size. It has a melting range (A. S. T. M. ball and ring method) of 105–114° C.

*Example 2*

Pounds
Maleic modified rosin ester gum (Amberol 801) (M. R. 140–150° C.) _____ 85
Carnauba wax _____ 15

Prepared as in Example 1. Melting range 116–127° C.

*Example 3*

Pounds
Maleic modified rosin ester gum (Amberol 800) (M. R. 115–125° C.) _____ 90
Candelila wax _____ 10

Prepared as in Example 1. Melting range 98–104° C.

*Example 4*

Pounds
Ester gum modified phenol formaldehyde resin (Amberol F7) (M. R. 135–145° C.) ____ 85
Paraffin wax (85° C.) _____ 10
Petroleum distillate (boiling range 263–290° C.) _____ 5

Prepared as in Example 1. The petroleum distillate is added to produce a composition which melts more readily than the resin-wax mixture alone.

*Example 5*

Pounds
Cumarone-indene resin (Cumar W2½) (M. R. 124–130° C.) _____ 90
Acrawax C (a synthetic wax). (Melting point 133–134° C.) _____ 10

Prepared as in Example 1. Melting range 126–130° C.

*Example 6*

Pounds
Fumaric modified rosin ester gum _____ 85
Paraffin wax (melting point 85° C.) _____ 10
Stearic acid _____ 5

Prepared as in Example 1. Melting range 93–97° C.

*Example 7*

Pounds
Ester gum modified phenol formaldehyde resin (Amberol F7) (M. R. 135–145° C.) ___ 90
Natural yellow refined ozokerite wax (78°) __ 10

Prepared as in Example 1. Melting range 114–121° C.

*Example 8*

Pounds
Phenolated Copal (Beckopol 1400) (M. R. 148–155° C.) _____ 85
Candelila Wax _____ 15

Prepared as in Example 1. Melting range 99–110° C.

While we have shown only a few examples of waxes and resins, others may obviously be used, provided they have the correct characteristics. The common untreated natural resins are generally unsatisfactory, since they are either insoluble in petroleum hydrocarbons (the copals), or yield very thin solutions and inhibit proper drying (rosin, damar). Treated natural resins (run copals, zinced rosin, etc.) are often satisfactory, as are many synthetic resins with the proper solubilities. As will be observed from the examples, both the natural and synthetic waxes may be used, including waxes of mineral and organic origin.

If the dusting composition has too low a softening point, the resultant dusted ink film will remain soft, and may cause adhesion of adjoining sheets of paper in storage and in shipment. If the resinous component is insoluble in the ink solvent, the print will have no finish, but will be dull. If the resinous component yields films with too low a viscosity (as is the case with practically all hydrocarbon soluble natural resins) the drying of the ink by the heat is retarded, so that the ink may offset; furthermore, the tendency to cause adhesion in storage is aggravated. We prefer, therefore, when the dusting compositions have low softening points, to select resins which yield high viscosity solutions, and to select compositions of higher softening point when the resins yield low viscosity solutions.

In the practice of our process with news inks, the finish is much improved, and the tendency to smudge is reduced; but the ink ordinarily penetrates sufficiently before the resin is applied so that all blurring is not overcome. This difficulty is of course overcome when using heat-setting inks. A typical satisfactory heat-setting ink may be made as follows:

| | Parts by weight |
|---|---|
| Carbon black | 15.0 |
| Stearin pitch | 2.5 |
| Varnish, composed of 55 parts by weight zinc resinate, 45 parts by weight petroleum distillate (boiling range 239–280° C.) | 81.9 |

Paper was printed with this ink, and part was dusted with the powdered composition of Example 1. Both prints were cross-sectioned, and the film thickness measured. The undusted print measured about 0.14 mil in thickness (3.6 microns); the dusted print measured about 0.18 mil (4.5 microns).

Other heat-setting inks may be used, containing various binders and petroleum hydrocarbons solvents; such inks are now well known to the art, and consist essentially of pigment, a binder, and a solvent of such characteristics that the ink is reasonably stable on the distribution system of the press and yet can be dried by the application of intense heat.

Various other changes can of course be made in our method without departing from the spirit of the invention which is defined in the claims.

We claim:

1. The method of producing high finish prints on a web traveling at high speed, which comprises printing on a surface of the traveling web with a press-stable ink containing a petroleum hydrocarbon liquid, dusting the resultant ink film with a composition consisting essentially of a resin having a softening point of at least about 100° C. and soluble in the hot petroleum hydrocarbon, and whose standard solution as defined in this specification has a viscosity of at least 10 poises at 30° C., removing excess dusting composition, and heating the printed surface to melt the powder.

2. The method of producing high finish prints on a web traveling at a speed greater than 500 feet per minute, which comprises printing on a surface of the traveling web with an ink containing a binder and a solvent therefor sufficiently non-volatile at 25° C. so that the ink is stable on a typographic press, but readily volatile at 150° C., dusting the resultant ink film with a composition consisting essentially of a resin having a softening point of at least about 100° C. and soluble in the hot ink solvent, and whose standard solution as defined in this specification has a viscosity of at least 10 poises at 30° C., removing excess dusting composition, and heating the printed surface to melt the powder and evaporate sufficient of the solvent to dry the ink.

3. The method of producing high finish prints on a web traveling at a speed greater than 500 feet per minute, which comprises printing on a surface of the traveling web with an ink containing a binder and a petroleum hydrocarbon solvent therefor sufficiently non-volatile at 25° C. so that the ink is stable on a typographic press, but readily volatile at 150° C., dusting the resultant ink film with a composition consisting essentially of a resin having a softening point of at least about 100° C. and soluble in petroleum hydrocarbons at the temperatures to which they are heated during drying, and whose standard solution as defined in this specification has a viscosity of at least 10 poises at 30° C., removing excess dusting composition, and heating the printed surface to melt the powder and evaporate sufficient of the solvent to dry the ink.

4. The method of producing high finish prints on a web traveling at a speed greater than 500 feet per minute which comprises printing on a surface of the traveling web with an ink containing a binder and a petroleum hydrocarbon solvent therefor sufficiently non-volatile at 25° C. so that the ink is stable on a typographic press, but readily volatile at 150° C., dusting the resultant ink film with a composition powdered to pass a 200 mesh screen, and consisting essentially of a resin having a softening point of at least about 100° C. and soluble in petroleum hydrocarbons at the temperatures to which they are heated during drying, and whose standard solution as defined in this specification has a viscosity of at least 10 poises at 30° C., removing excess dusting composition, and heating the printed surface to melt the powder and evaporate sufficient of the solvent to dry the ink.

5. The method of producing high gloss prints on a web traveling at high speed, which comprises printing on one side of the traveling web with a press-stable ink containing a petroleum hydrocarbon liquid, dusting the resultant ink film with a composition consisting essentially of a resin having a softening point of at least about 100° C. and soluble in the hot petroluem hydrocarbon, and whose standard solution as defined in this specification has a viscosity of at least 10 poises at 30° C., removing excess dusting composition, printing on the other side of the web with a press-stable ink containing a petroleum hydrocarbon liquid, dusting the resultant ink film with a composition consisting essentially of a resin having a softening point of at least about 100° C. and soluble in the hot petroleum hydrocarbon, and whose standard solution as defined in this specification has a viscosity of at least 10 poises at 30° C., removing excess dusting composition, and heating the printed web to melt the powder on both sides of said web.

6. The method of producing high gloss prints on both sides of a web traveling at high speed, which comprises printing on one side of the traveling web with an ink containing a binder and a petroleum hydrocarbon solvent therefor sufficiently non-volatile at 25° C. so that the ink is stable on a typographic press, but readily volatile at 150° C., dusting the resultant ink film with a composition consisting essentially of a resin having a softening point of at least about 100° C. and soluble in petroleum hydrocarbons, and whose standard solution as defined in this specification has a viscosity of at least 10 poises at 30° C., removing excess dusting composition, printing on the other side of the web with an ink containing a binder and a petroleum hydrocarbon solvent therefor sufficiently non-volatile at 25° C. so that the ink is stable on a typographic press but readily volatile at 150° C., dusting the resultant ink film with a composition consisting essentially of a resin having a softening point of at least about 100° C. and soluble in petroleum hydrocarbons, and whose standard solution as defined in this specification has a viscosity of at least 10 poises at 30° C., removing excess dusting composition, and heating the printed web to melt the powder and evaporate sufficient of the solvent to dry the ink on both sides of said web.

7. The method of printing which comprises printing on one side of a traveling web with a press-stable ink containing a solvent which is relatively non-volatile at 25° C., but which is volatile with heat, applying to the wet ink a powdered high melting resin composition which is soluble in the solvent of the ink and whose standard solution as defined in this specification has a viscosity of at least 10 poises at 30° C., printing the second side of the web with a similar ink, applying a similar powder to the wet ink, and passing the web printed on both sides through a heating zone to dry the ink.

8. A composition to be applied to a wet film of printing ink consisting of a powdered mixture of from 75–95% resin and from 25–5% of wax, the composition having a softening point of at least about 90° C., and the resin therein yielding a standard solution as defined in this specification having a viscosity of at least 10 poises at 30° C.

9. A composition to be applied to a wet film of printing ink consisting of a powdered mixture of from 75–95% resin and from 25–5% of wax, the composition having a softening point of at least about 90° C., and the resin therein yielding a standard solution as defined in this specification having a viscosity of at least 10 poises at 30° C., substantially all the powder being capable of passage through a 200 mesh screen.

10. A composition to be applied to a wet film of printing ink consisting of a powder ground through 200 mesh and having a softening point of at least about 90° C., and consisting essentially of a petroleum hydrocarbon soluble resin whose standard solution as defined in this specification has a viscosity of at least 10 poises at 30° C.

ALBERT E. GESSLER.
DOMINIC J. BERNARDI.